(12) United States Patent
Amada

(10) Patent No.: US 8,120,993 B2  
(45) Date of Patent: Feb. 21, 2012

(54) ACOUSTIC TREATMENT APPARATUS AND METHOD THEREOF

(75) Inventor: Tadashi Amada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 338 days.

(21) Appl. No.: 12/472,469

(22) Filed: May 27, 2009

(65) Prior Publication Data

US 2009/0296526 A1     Dec. 3, 2009

(30) Foreign Application Priority Data

Jun. 2, 2008    (JP) ................................ 2008-144215

(51) Int. Cl.  
     *G01S 3/80*       (2006.01)
(52) U.S. Cl. ..................... 367/124; 367/118; 367/126
(58) Field of Classification Search .............. 367/98, 367/118, 124, 126  
See application file for complete search history.

(56) References Cited

U.S. PATENT DOCUMENTS

| | | | | |
|---|---|---|---|---|
| 5,425,000 | A * | 6/1995 | Reed et al. ................. | 367/131 |
| 5,481,505 | A * | 1/1996 | Donald et al. ............... | 367/130 |
| 5,914,912 | A * | 6/1999 | Yang ......................... | 367/119 |
| 6,154,552 | A * | 11/2000 | Koroljow et al. ............ | 381/313 |
| 6,198,693 | B1 * | 3/2001 | Marash ...................... | 367/125 |
| 6,424,596 | B1 * | 7/2002 | Donald ...................... | 367/135 |
| 2002/0009204 | A1 * | 1/2002 | Matsumura ................... | 381/98 |
| 2003/0147538 | A1 * | 8/2003 | Elko .......................... | 381/92 |
| 2005/0084116 | A1 * | 4/2005 | Schulz et al. ................. | 381/92 |
| 2006/0133211 | A1 * | 6/2006 | Yang .......................... | 367/154 |
| 2008/0181058 | A1 * | 7/2008 | Hayakawa .................... | 367/125 |
| 2008/0247565 | A1 * | 10/2008 | Elko et al. ................... | 381/92 |
| 2008/0260175 | A1 * | 10/2008 | Elko .......................... | 381/73.1 |

FOREIGN PATENT DOCUMENTS

| | | | |
|---|---|---|---|
| WO | WO 2006110230 A1 * | 10/2006 | |
| WO | WO 2007059255 A1 * | 5/2007 | |

OTHER PUBLICATIONS

T. Nishiura, T. Yamada, S. Nakamura, K. Shikano, "Localization of multiple sound sources based on a CSP analysis with a microphone array," icassp, vol. 2, pp. II1053-II1056, Acoustics, Speech, and Signal Processing, 2000 vol. 2. 2000 IEEE International Conference on, 2000.*

Hiroshi Saruwatari, Satoshi Kurita, Kazuya Takeda, Fumitada Itakura, Tsuyoki Nishikawa, and Kiyohiro Shikano. "Blind source separation combining independent component analysis and beamforming" EURASIP J. Appl. Signal Process. 2003 (Jan. 2003), 1135-1146.*

J.L. Flanagan, et al, "Computer-steered microphone arrays for sound transduction in large rooms," Journal of Acoustical Society of America, vol. 78, No. 5, pp. 1508-1518, 1985.

Nicoleta Roman, et al, "Speech segregation based on sound localization," Journal of Acoustical Society of America, vol. 114, No. 4, pp. 2236-2252, 2003.

* cited by examiner

*Primary Examiner* — Thomas Tarcza  
*Assistant Examiner* — James Hulka  
(74) *Attorney, Agent, or Firm* — Turocy & Watson, LLP (57) ABSTRACT

An acoustic treatment apparatus obtains a first output signal by performing filtering for forming a directivity in a first direction for received sound signals of sound receivers, obtains a second output signal by performing filtering for forming a directivity in a second direction different from the first direction for received sound signals of sound receivers, obtains a strength ratio between a strength of the first output signal and a strength of the second output signal, and estimates a sound source direction on the basis of the strength ratio.

11 Claims, 5 Drawing Sheets

ACOUSTIC TREATMENT APPARATUS AND METHOD THEREOF

CROSS-REFERENCE TO RELATED APPLICATION

This application is based upon and claims the benefit of priority from the Japanese Patent Application No. 2008-144215, filed on Jun 2, 2008; the entire contents of which are incorporated herein by reference.

FIELD OF THE INVENTION

The present invention relates to an acoustic treatment apparatus configured to perform direction estimation and a sound source separation robust for a change in balance of sensitiveness among a plurality of sound receivers in an array technology used in hands-free talk or voice recognition and a method thereof.

DESCRIPTION OF THE BACKGROUND

In recent years, a study of a microphone array technology for (1) emphasizing signals coming from a specific direction, (2) estimating a direction from which the signals come when the direction is unknown, and (3) separating a plurality of sound sources coming from the different directions using a plurality of microphones is becoming active.

A first method of this technology is a most simple method of a microphone array, and Delayed Sum Array is exemplified (see "Computer-steered microphone arrays for sound transduction in large rooms," by J. L. Flanagan, J. D. Johnston, R. Zahn, and G. W. Elko, J. Acoust. Soc. Am., vol. 78, No. 5, pp. 1508-1518, 1985). In this method, signals from a specific direction are emphasized, that is, a directional property is formed in the specific direction on the basis of a principle such that when a predetermined delay is inserted into signals from respective microphones and adding these signals, only signals coming from a preset direction are combined and emphasized in the same phase, while signals coming from other directions are not aligned in phase and hence are mutually attenuated.

As a second method, there is a method of using a ratio of signal strengths received from two microphones as indices when determining in which direction of left and right a sound source exists for an array including two microphones, or when separating sounds from signals including a left sound and a right sound mixed therein. This method is based on a phenomenon that a microphone located on a side where a sound source is present receives a larger sound than a microphone on an opposite side. In "Speech segregation based on sound localization" by N. Roman, D. Wang, and G. Brown, J. Acoust. Soc. Am., vol. 114, No. 4, pp. 2236-2252, 2003, a method of separating a sound source using this principle is presented.

The method on the basis of the signal strength ratio as described above is predicated on the fact that the sensitivities of the left and right microphones are the same.

Actually, however, the sensitivities of the microphones vary, and changes with time are not small, so that it is difficult to keep the same sensitivities all the time.

Therefore, there arises a problem of deterioration of performance in sound direction estimation and a sound source separation due to the variations in power ratio.

SUMMARY OF THE INVENTION

Accordingly, it is an object of the invention to provide an acoustic treatment apparatus which achieves direction estimation even when sensitivities of sound receivers such as microphones vary or change with time and a method thereof.

According to embodiments of the invention, there is provided an acoustic treatment apparatus including: a plurality of sound receivers configured to receive sounds from a sound source; a first beam former unit configured to obtain a first output signal by performing filtering for forming a directivity in a first direction on received sound signals of the sound receivers; a second beam former unit configured to obtain a second output signal by performing filtering for forming a directivity in a second direction which is different from the first direction on received sound signals of the sound receivers; a power comparing unit configured to obtain strength comparison data from a strength of the first output signal and a strength of the second output signal; and a sound source direction estimating unit configured to estimate sound source direction data of the sound source on the basis of the strength comparison data.

According to the embodiments of the invention, the sound source direction is estimated even when the sensitivities of the sound receivers vary and are changed with time.

DETAILED DESCRIPTION OF THE INVENTION

Referring now to the drawings, an acoustic treatment apparatus according to a first embodiment of the invention will be described.

First Embodiment

Figure 1:
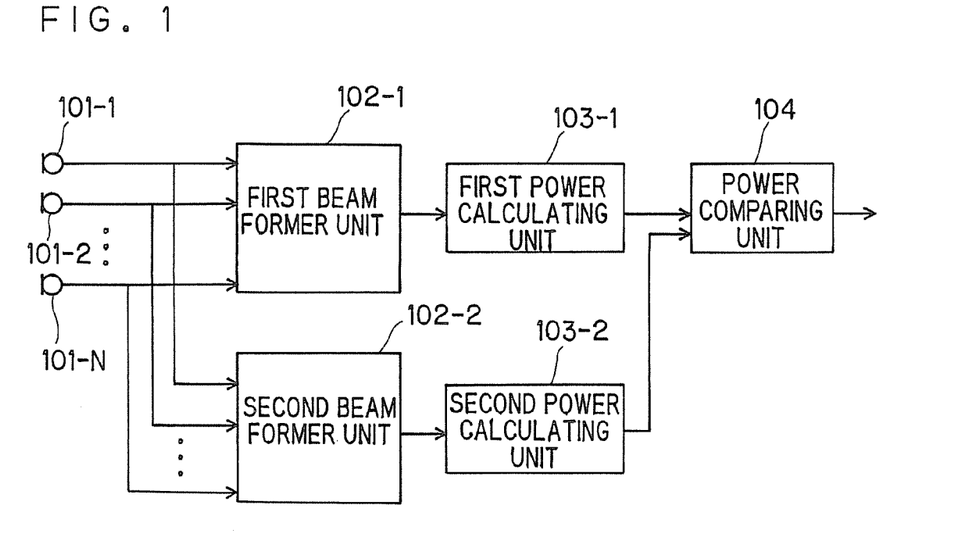
FIG. 1 is a block diagram showing a first embodiment of the invention.
Figure 2:
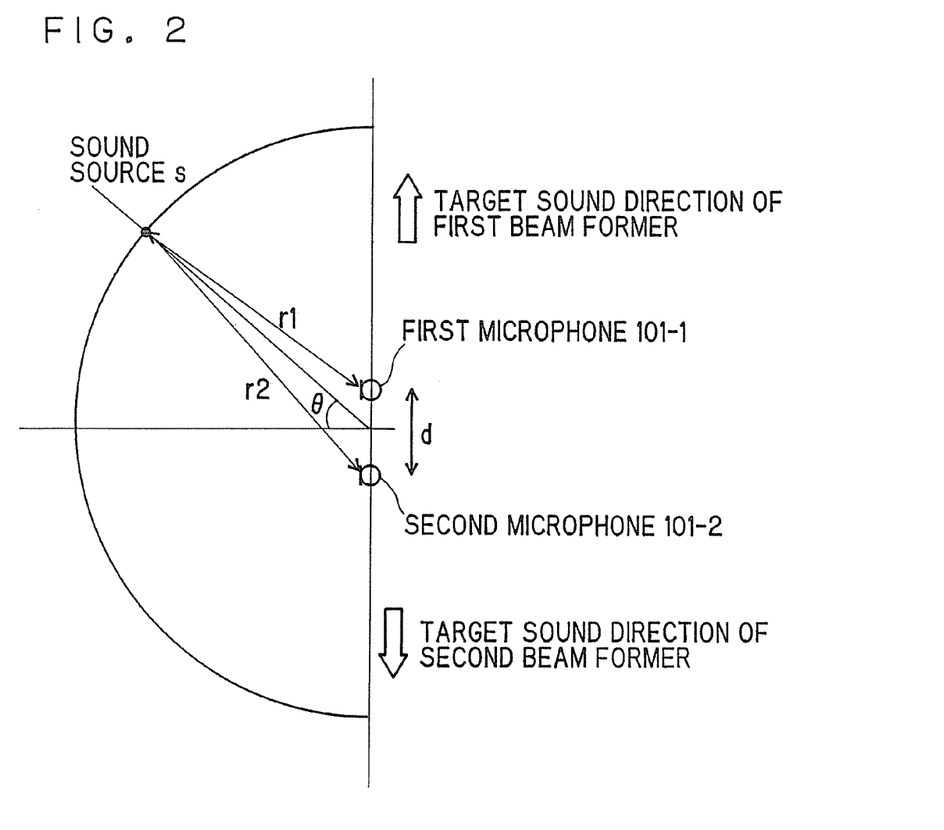
FIG. 2 is a drawing showing a relation between a sound source and a microphone.

Referring now to FIG. 1 to FIG. 3, the acoustic treatment apparatus according to the first embodiment will be described.

FIG. 1 is a block diagram showing an acoustic treatment apparatus according to the first embodiment.

The acoustic treatment apparatus includes N pieces of sound receivers 101-1 to 101-N, a first beam former unit 102-1 and a second beam former unit 102-2 configured to emphasize and output signals coming from a specific direction by filtering received sound signals, a first power calculating unit 103-1 and a second power calculating unit 103-2 configured to calculate powers as strengths of the output signals, and a power comparing unit 104 configured to obtain ratios of the powers calculated thereby.

The first beam former unit 102-1, the second beam former unit 102-2, the first power calculating unit 103-1, the second power calculating unit 103-2, and the power comparing unit 104 are implemented by computer readable programs stored or transmitted to a computer.

A principle of operation of the acoustic treatment apparatus will be described in due course.

Signals x1-xN inputted to the sound receivers 101-1 to 101-N are inputted to the first beam former unit 102-1 and the second beam former unit 102-2.

As the beam former units 102-1, 102-2, methods of controlling directivity directly such as Delayed Sum array or Griffith-Jim type array are applicable. In addition to it, a method of controlling the directivity indirectly on the basis of properties of signals such as ICA (Independent Component Analysis) is applicable.

The two beam former units 102-1, 102-2 are designed to have the directivities in advance in the different directions. In other words, the beam former units 102-1, 102-2 are designed to have target sound directions (directions in which the directivity is provided) different from each other in advance. FIG. 2 shows an example of setting of the directivity.

In FIG. 2, the number of microphones as the sound receivers is two, and opposite directions along a line connecting two microphones 101-1, 2 are set as the target sound direction of the first beam former unit 102-1 and the target sound direction of the second beam former unit 102-2, respectively. The target sound directions may be any other directions as long as they are directions different from each other.

The first power calculating unit 103-1 and the second power calculating unit 103-2 calculate powers of outputs from the two beam former units 102-1, 102-2 respectively, and the power comparing unit 104 calculates and outputs the ratio of the two powers.

In the related art, the power ratios generated by the direction from which the signals come are used for estimating the directions of the sound sources or separating the sound sources. In FIG. 2, a distance r1 from a sound source S to the first microphone 101-1 is shorter than a distance r2 to the second microphone 101-2, so that the first microphone 101-1 receives a larger sound. Therefore, by observing the power ratio by the first microphone 101-1 and the second microphone 101-2, a lead to know the position of the sound source is obtained.

Actually, however, the sensitivities of the microphones vary, and change with time is not small, so that it is difficult to keep the same sensitivities all the time. Therefore, the power ratio varies not only by the difference in the position of the sound source, but also by unbalanced sensitivities of the microphones, so that there is a problem of lowering of the accuracy of the estimation of the position of the sound source.

In the first embodiment, by not employing the ratio of the outputs of the microphones directly, but by employing the ratio of the outputs of the two beam former units 102-1, 102-2, a power ratio (beam former output power ratio) robust for the unbalance of the microphone sensitivities is obtained, so that the performances of the estimation of the sound source direction and the sound source separation are maintained even in a state in which the microphone sensitivities are out of balance.

FIGS. 3A to 3D show results of experiment in which the acoustic treatment apparatus in the first embodiment are compared with the method in the related art in the state shown in FIG. 2.

As conditions of experimentation, the first microphone 101-1 and the second microphone 101-2 were used, the distance between the microphones was set to d=5 cm, the directions of target sounds were set to −90 degrees direction (upward direction in FIG. 2) for the first beam former unit 102-1 and to 90 degrees direction (downward direction in FIG. 2) for the second beam former unit 102-2, and the sound source S which generates sinusoidal waves of 1 kHz was moved from −90 degrees to 90 degrees while maintaining a distance of 50 cm from the centers of the first microphone 101-1 and the second microphone 101-2.

As the related art, referring to FIGS. 3A and 3B, a case where the output powers of the first microphone 101-1 and the second microphone 101-2 are used will be described.

The ratio Rpow between the output power |X1| of the first microphone 101-1 and the output power |X2| of the second microphone 101-2 will be expressed by the following expression.

$$R_{pow} = \frac{|X_1|^2}{|X_2|^2} = \frac{A_1^2/r_1^2}{A_2^2/r_2^2}$$

where r1 is the distance from the first microphone 101-1 to the sound source S, r2 is the distance from the second microphone 101-2 to the sound source S, A1 is the sensitivity of the first microphone 101-1, A2 is the sensitivity of the second microphone 101-2.

Accordingly, it is understood that the output of the first microphone 101-1 which is located closer to the sound source S has a larger power than the opposite side. The output power obtained when the sensitivity of the first microphone 101-1 is in the normal state is indicated by a solid line, and the output power when the sensitivity is reduced to about a half is indicated by a dot line.

In general, the sensitivity of the microphone varies or fluctuates significantly and the change in sensitivity to a half is not special.

Figure 3A:
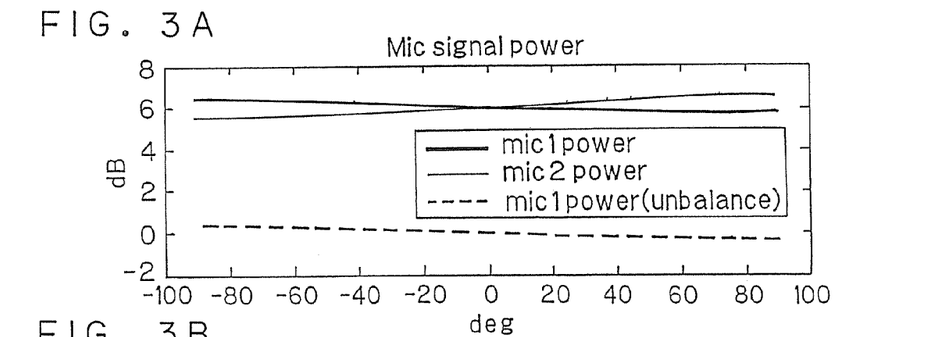
FIGS. 3A to 3D are examples of experiments of a beam former output power ratio.
Figure 3B:
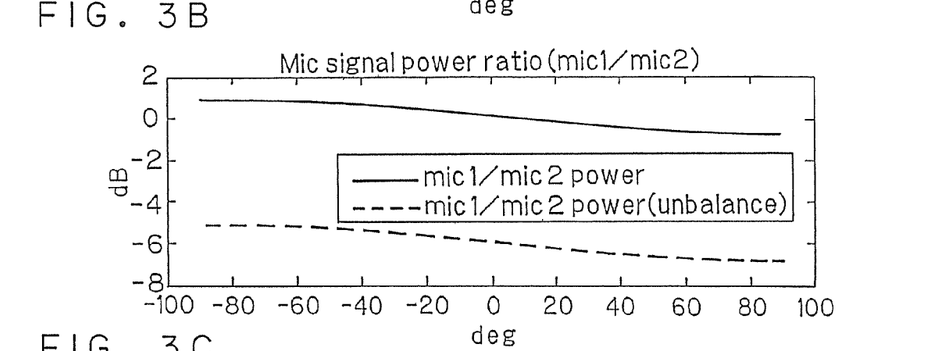

FIG. 3B shows a power ratio of the output of the microphone. A solid line represents the power ratio in a case where the sensitivity of the first microphone 101-1 is normal, and a broken line represents the same in a case where the sensitivity of the first microphone 101-1 is reduced to a half.

As shown in FIGS. 3A and 3B, the variations in power ratio is large for the change in sensitivities of the microphones, and hence it is difficult to estimate the position (direction) of the sound source from the power ratio.

Figure 3C:
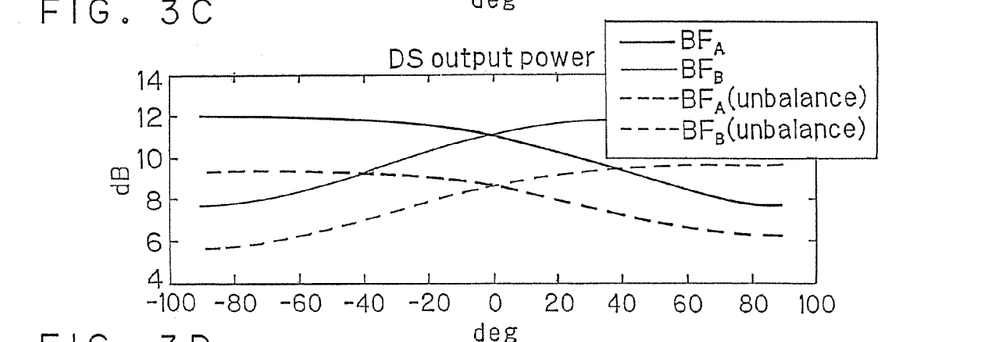
Figure 3D:
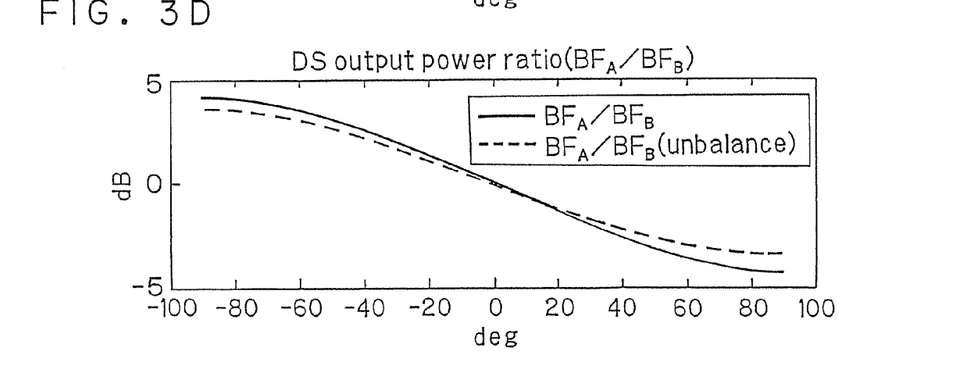

Referring now to FIGS. 3C and 3D, a case where the acoustic treatment apparatus in the first embodiment will be described. The beam formers employ Delayed Sum method.

In FIG. 3C, powers of outputs of two beam formers (referred to also as "BF" in abbreviation) are shown. The target sound direction of $BF_A$ is a direction of −90 degrees, and that of $BF_B$ is a direction of 90 degrees.

The ratio $R_{BF}$ between the $BF_A$ and the $BF_B$ will be as follows.

$$R_{BF} = \frac{BF_A}{BF_B}$$

$$BF_A = \frac{A_1^2}{r_1^2} + \frac{A_2^2}{r_2^2} + 2\frac{A_1 A_2}{r_1 r_2}\cos\omega(\Delta_S \Delta_A)$$

where ΔS is a difference of arrival time depending on the position of the sound source, and ΔA is a delayed time obtained by the Delayed Sum array.

A solid line in FIG. 3C shows a case in which the sensitivity of the first microphone 101-1 is normal, and a broken line shows a case in which the sensitivity of the first microphone 101-1 is reduced to a half.

What is to be noted here is a point that the influence of the change in sensitivity of the first microphone 101-1 is generated in both the beam formers.

Consequently, even when the change in sensitivity is occurred in the microphone, it is cancelled in the beam former output power ratio shown in FIG. 3D, and hence the power ratios whose values are almost the same (beam former output power ratio) are obtained.

The method described above utilizes the fact that the strengths of the outputs from the two beam formers having the different target directions are different depending on the position of the sound source, and the difference is robust for the unbalance of the sensitivities of the microphones. Therefore, the same effect is obtained even when the amplitude is used instead of the output powers of the beam formers as a yardstick of the strength.

The power and the amplitude may be expressed in a non-linear scale such as decibel.

The difference in strength is obtained from the difference instead of the ratio.

In the first embodiment, the two beam formers are assumed to have the target sound directions of 90 degrees and −90 degrees, respectively. However, the directions do not necessarily have to be these directions.

When the estimated position of the sound source is known in advance to some extent, for example, when the position of a speaker is limited by the position of a seat such as in a vehicle cabin, or when the position of the sound source is measured in another method in advance in the case of a teleconference or the like system, it is contemplated to design so as to achieve a maximum beam former output power ratio for a speech of the speaker by setting the target sound direction of one of the beam formers to have the maximum sensitivity for the corresponding direction, and that of the other beam former to have a minimum sensitivity, respectively.

On installation grounds, for example, when an angle corresponding to an integer sample delay in a time area does not correspond to a proper angle, the angle may be used without problem.

There are following methods of calculating the beam former output power ratios in terms of timing.

A first one is a method calculating signals discretized in the direction of the time on the sample-to-sample basis, a second one is a method of smoothening the same in the direction of the time, and a third one is a method of using representative values such as average values or median in a frame having a predetermined number of samples.

In the case of calculating in a frequency area, the same methods as in the case of the time area may be applied for a signal sequence obtained by shifting a predetermined analytical window moment to moment.

Second Embodiment

Figure 4:
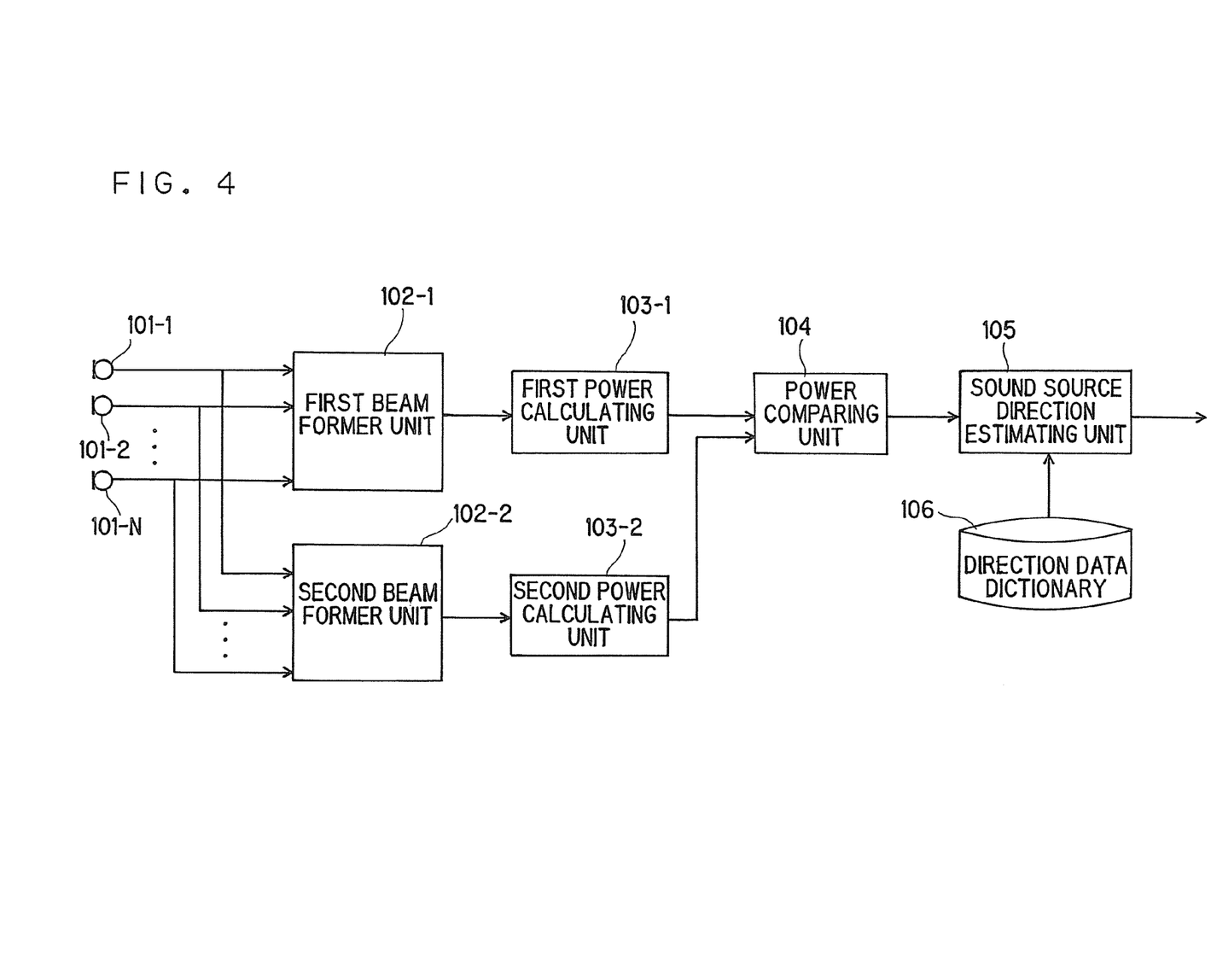
FIG. 4 is a block diagram showing a second embodiment of the invention.

Referring now to FIG. 4, the acoustic treatment apparatus according to a second embodiment will be described.

FIG. 4 is a block diagram showing the acoustic treatment apparatus according to the second embodiment.

According to the second embodiment, a sound source direction estimating unit 105 and a direction data dictionary 106 are provided in addition to the acoustic treatment apparatus in the first embodiment.

A principle of operation of the acoustic treatment apparatus according to the second embodiment will be described.

The procedure until the output of the power comparing unit 104 is obtained is the same as in the first embodiment, the description will be omitted.

The sound source direction estimating unit 105 estimates the sound source direction on the basis of the beam former output ratio obtained by the power comparing unit 104 and data in the direction data dictionary 106.

More specifically, a correspondence table of the directions of the sound source and the beam former output power ratios as indicated by the solid line in FIG. 3D are stored in the direction data dictionary 106. Then, the sound source direction estimating unit 105 transforms the inputted beam former output power ratio (corresponding to the vertical axis in FIG. 3D) into an angle (corresponding to the lateral axis of the same), and the angle is outputted as the sound source direction.

Actually, precise angle data is not necessary, and in some cases, only data indicating whether the sound source is present in the right direction or in the left direction is necessary. In such a case, data for transforming the positive or negative of the beam former output power ratios into the left or right as the sound source direction may be stored in the direction data dictionary 106.

In this manner, the data for transforming the beam former output power ratios into the directions of the sound source may be stored in the direction data dictionary 106 according to applications or required angular resolutions.

When analytical expression of the correspondence is possible, expressions may be used instead of the correspondence table.

There is a classical method of estimating the sound source direction by obtaining the outputs while shifting the target direction of the beam former from −90 degrees to 90 degrees, and employing the maximum value as the sound source direction (Beam Former method). Disadvantages of the beam former method is that a large amount of calculation is necessary because the beam former is applied to a number of target directions. Also, since the output value varies with the change of the microphone sensitivity, it is difficult to memorize the output value in advance to simplify the calculation, so that the search of the maximum value for all the directions is always necessary.

In contrast, in the second embodiment, what is needed is to apply the beam formers in two directions, and the amount of calculation is small. Also, by using the beam former output ratio (or the difference), the changes in the output values with respect to the changes of the microphone sensitivity are cancelled, and robustness for the changes of the microphone sensitivity is improved. Therefore, the position of the sound source is more or less specified by referencing the graph of the ratio obtained in advance.

Third Embodiment

Referring now to FIG. 4, the acoustic treatment apparatus according to a third embodiment will be described.

Figure 5:
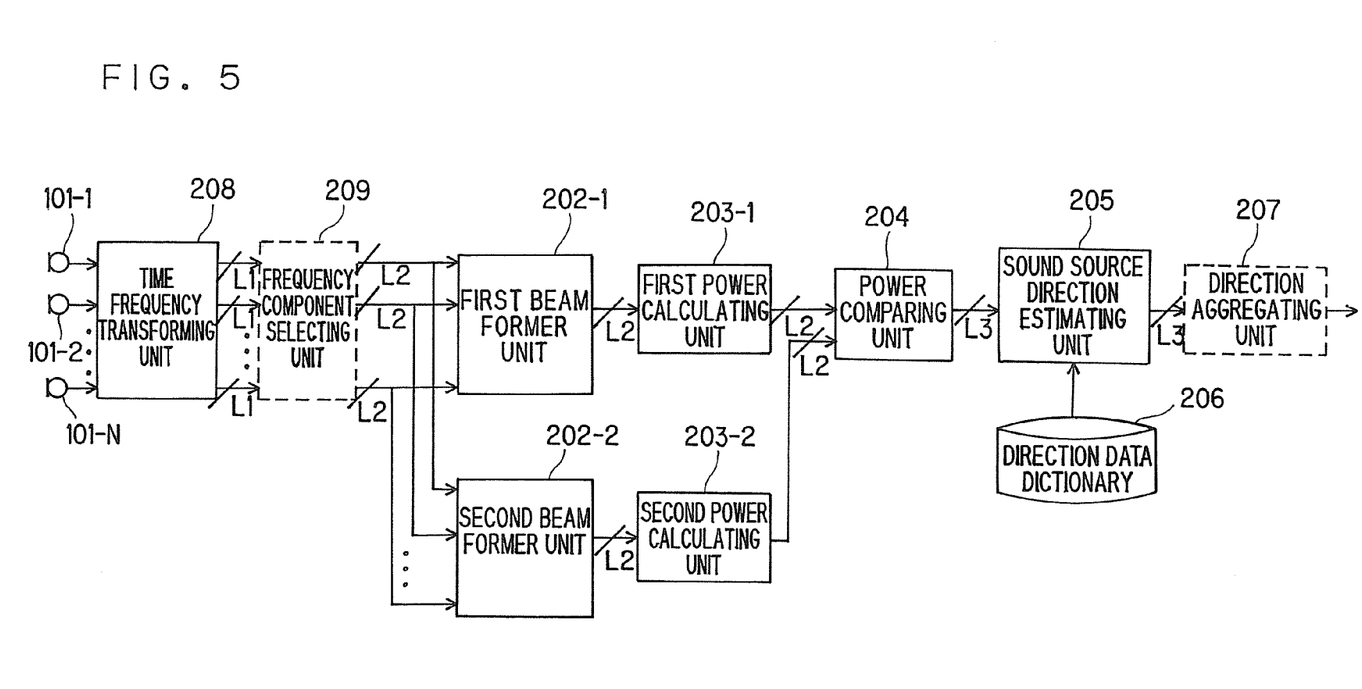
FIG. 5 is a block diagram showing a third embodiment of the invention.

FIG. 5 is a block diagram of the acoustic treatment apparatus according to the third embodiment.

The acoustic treatment apparatus in the third embodiment includes the sound receivers 101-1 to 101-N, a time frequency transforming unit 208, a frequency component selecting unit 209, a first beam former unit 202-1 and a second beam former unit 202-2 configured to emphasize and output signals coming from a specific direction by filtering the received sound signals for the individual frequency components, a first power calculating unit 203-1 and a second power calculating unit 203-2 configured to calculate the powers of the output signals for the individual frequency components, a power comparing unit 204 configured to obtain the ratios for the individual frequency components, a sound source direction estimating unit 205 configured to estimate the directions of the sound source for the individual frequency components using a direction data dictionary 206, and a direction aggregating unit 207 configured to aggregate the directions of sound sources for the individual frequency components into one direction.

A principle of operation of the acoustic treatment apparatus according to the third embodiment will be described.

Although the operation is roughly the same as the second embodiment, it is different from the second embodiment in that the signals are divided into units of frequency for processing.

The time frequency transforming unit 208 transforms time signals obtained by the sound receivers 101-1 to 101-N respectively into signals in the frequency range using a discrete Fourier transform. Assuming that the length of the window is 2(L1−1), L1 pieces of the frequency components are normally obtained.

Subsequently, the frequency component selecting unit 209 selects the frequency components to be applied with the following process. As a standard of selection, improvement of the accuracy of estimation in an environment with a lot of noises is achieved by selecting a frequency (for example, 100 Hz to 3 kHz) which provides a high power to speech signals.

Deleting a low area which is subject to the noises (for example, 100 Hz or lower) is also effective for improving the accuracy of estimation.

The standard of selection of the frequency component is to select an effective component from the target signals, and other methods of selection are also applicable. It is also possible to combine adjacent frequency components and process as a sub-band for the purpose of reduction of the amount of calculation.

When treating the entire frequency components, the frequency component selecting unit 209 is not necessary.

The L2 each of frequency components for the respective channels selected in this manner is processed for the individual frequency components by the first beam former and the second beam former having the directivities of different directions, an output of one channel is outputted from the each beam former for the each respective frequency component, the first power calculating unit 203-1 and the second power calculating unit 203-2 calculate powers for the individual frequency components, and the powers are supplied to the power comparing unit 204.

Here, although the power ratios are calculated as in the embodiments described above, the adjacent frequency components may be aggregated to obtain an average value at this time. By averaging, further stabilized power ratios are achieved.

The power comparing unit 204 outputs power ratios of L3 pieces of the frequency components. When the process of averaging or the like is not performed, L2 is equal to L3.

The sound source direction estimating unit 205 outputs estimated sound source directions for the individual frequency components using the relation between the power ratios and the sound source directions stored in the direction data dictionary for the individual frequency components.

The direction aggregating unit 207 generates a predetermined number of sound source directions from the L3 estimated sound source directions.

As a method of generation, average values, medians, or modes are used. There may be a case where the direction is determined by clustering the obtained directions, when the predetermined number is 2 or more.

The direction aggregating unit 207 is not necessary when the directions for the individual frequency components are sufficient. For example, a method of separating speeches of a plurality of the speakers by dividing the frequency components according to the estimated sound source directions for the individual frequency components is exemplified.

Fourth Embodiment

Figure 6:
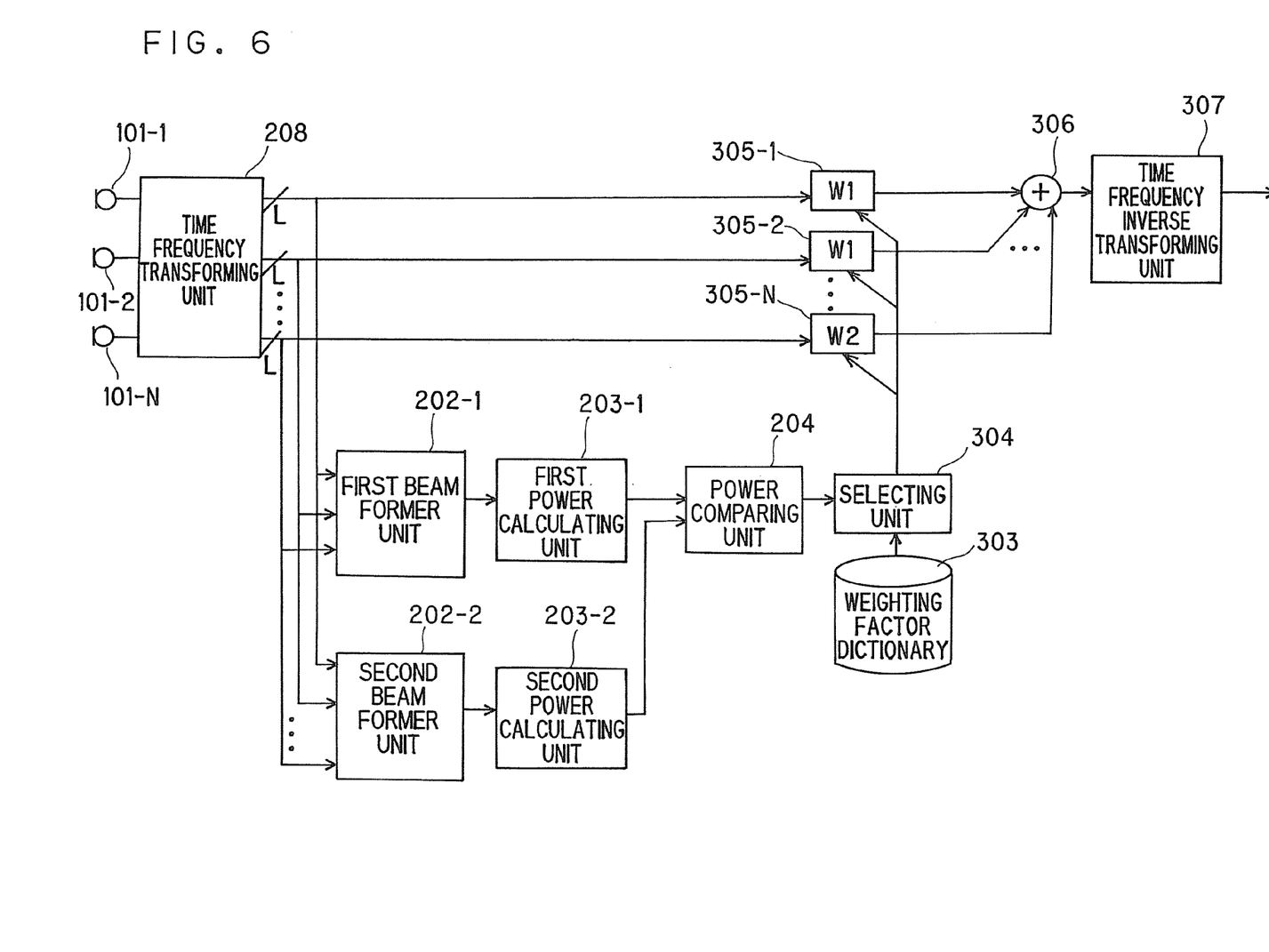
FIG. 6 is a block diagram showing a fourth embodiment of the invention.

Referring now to FIG. 6, the acoustic treatment apparatus according to a fourth embodiment will be described.

FIG. 6 is a block diagram showing the acoustic treatment apparatus according to the fourth embodiment.

The acoustic treatment apparatus in the fourth embodiment includes the sound receivers 101-1 to 101-N, the time frequency transforming unit 208, the first beam former unit 202-1 and the second beam former unit 202-2 configured to emphasize and output signals coming from a specific direction by filtering the received sound signals for the individual frequency components, the first power calculating unit 203-1 and the second power calculating unit 203-2 configured to calculate the powers of the output signals for the individual frequency components, the power comparing unit 204 configured to obtain the ratios for the individual frequency components, a selecting unit 304 configured to select weighting factors corresponding to the power ratios from a weighting factor dictionary 303, a weighting unit 305 configured to weigh the frequency components of the respective channels, an adding unit 306, and a time frequency inverse transforming unit 307 configured to transform the added output inversely to the time signals.

A principle of operation of the acoustic treatment apparatus according to the fourth embodiment will be described. In the fourth embodiment, an array process which emphasizes and outputs only the input signals from the specific directions using the beam former output power ratios is realized.

The procedure until the beam former output power ratios are obtained by the power comparing unit 204 from the frequency components outputted from the time frequency transforming unit 208 is the same as that in the third embodiment.

In the fourth embodiment, the selecting unit 304 selects the weighting factors from the weighting factor dictionary 303 with the beam former output power ratios as characteristic amounts. In other words, the weighting factor dictionary 303 includes the characteristic amounts and the weighting factors stored in one-to-one correspondence, and the selecting unit 304 selects the weighting factor corresponding to the characteristic amount from the weighting factor dictionary 303. Then, this weighting factor is set to be a value which is increased as it approaches the direction where the sound source is present. However, the direction where the sound source is present in this case means the direction of the target sound source which is set in advance. Accordingly, outputting of the direction as the weight by emphasizing only the target sound source instead of emphasizing all the sound sources is achieved.

The weighting factors are multiplied by the frequency components of the respective channels by the weighting unit 305, and are added to each other by the adding unit 306. Since the outputs of the power comparing unit 204 are provided for the individual frequency components, the process from then onward is also performed for the individual frequency components. In other words, when the power ratio of the $k^{th}$ frequency component is p(k), the weighting factor W(n, k) to be multiplied by the $k^{th}$ frequency component of the $n^{th}$ sound receiver (channel number n) will be as the expression (1) shown below.

$$W(n, k) = F(n, k, p(k)) \quad (1)$$

where F(n, k, p) is a function for selecting a weighting factor that the characteristic amount (here, the beam former output power ratio) corresponds to p(k) from the weighting factor dictionary 303 of the channel number n and the frequency component k. W(n, k) is multiplied by an input signal X(n, k) by a weighting unit 305-n of the channel n, and is added by the adding unit 306, so that an output signal Y(k) is obtained, which is expressed as the following expression (2);

$$Y(k) = \sum_{n=1}^{N} W(n, k) \times X(n, k) \quad (2)$$

W(n, k) is in general a complex number. Y(k) is inversely transformed to the time signal by the time frequency inverse transforming unit 307.

The weighting factor dictionary 303 is obtained in advance by a method disclosed in JP-A-2007-10897 KOKAI. As described in JP-A-2007-10897 KOKAI, the characteristic amount may be of a multi-dimension by combining with values other than the beam former output power ratio.

Alternatively, as in the third embodiment, the beam former output power ratio may be used only for part of the frequency components.

The weighting addition may be an expression obtained by applying the inverse Fourier transform only on the weight, and folding in the same together with the time signals. It is based on a basic principle such that the product in the frequency area is expressed by folding in the time area.

Modifications

The invention is not limited to the embodiments shown above, and may be modified variously without departing from the scope of the invention.

What is claimed is:

1. An acoustic treatment apparatus comprising:
   a plurality of sound receivers configured to receive sounds from a sound source;
   a first beam former unit configured to obtain a first output signal by performing filtering for forming a directivity in a first direction on received sound signals of the sound receivers;
   a second beam former unit configured to obtain a second output signal by performing filtering for forming a non-zero directive signal in a second direction which is different from the first direction on received sound signals of the sound receivers;
   a power comparing unit configured to obtain strength comparison data from a strength of the first output signal and a strength of the second output signal; and
   a sound source direction estimating unit configured to estimate sound direction data of the sound source on the basis of the strength comparison data.

2. The apparatus according to claim 1, wherein the sound source direction data is an angle indicating the sound source direction.

3. The apparatus according to claim 1, wherein the strength comparison data is a strength ratio of the first output signal with respect to the second output signal or a difference therebetween.

4. The apparatus according to claim 1, wherein the sound source direction estimating unit includes a storage unit in which a relation between the sound source direction data and the strength comparison data in one-to-one correspondence is stored in advance, and estimates the sound source direction data on the basis of the obtained strength comparison data according to the relation stored in the storage unit in one-to-one correspondence.

5. The apparatus according to claim 2, wherein the sound source direction estimating unit estimates the first direction as the angle when the strength of the first output signal is higher than the strength of the second output signal, and estimates the second direction as the angle when the strength of the second output signal is higher than the strength of the first output signal.

6. The apparatus according to claim 1, further comprising a separating unit configured to separate respective received signals of the respective sound receivers for the respective given frequency components, and
   the first beam former unit obtains the first output signals respectively for the received sound signals for the individual frequency components of the respective sound receivers,
   the second beam former unit obtains the second output signals respectively for the received sound signals for the individual frequency components of the respective sound receivers,
   the power comparison unit obtains strength comparison data for the individual frequency components from strengths of the first output signals for the individual frequency components and the strengths of the second output signals for the individual frequency components, and
   the sound source direction estimating unit estimates the sound source direction data for the individual frequency components on the basis of the strength comparison data for the individual frequency components.

7. The apparatus according to claim 6, wherein the sound source direction data is estimated for all the separated individual frequency components or for some of the separated frequency components.

8. The apparatus according to claim 7, wherein the part of the frequency components is frequency components in an area lower than a threshold value.

9. The apparatus according to claim 6, wherein the sound source direction data is a weighting factor increasing as it approaches the direction where the preset target sound source is present, and
   the apparatus further comprises an adding unit configured to weight and add the received sound signals for the individual frequency components to obtain a third output signal on the basis of the weighing factor.

10. An acoustic treatment method comprising:
    obtaining a first output signal by performing filtering for forming a non-zero directive signal in a first direction on received sound signals of a plurality of sound receivers for receiving sounds from the sound source;
    obtaining a second output signal by performing filtering for forming a directivity in a second direction which is different from the first direction on received sound signals of the sound receivers;
    obtaining strength comparison data from a strength of the first output signal and a strength of the second output signal; and
    estimating sound direction data of the sound source on the basis of the strength comparison data.

11. An acoustic treatment program stored in a computer readable medium, the program realizing the functions of:
    obtaining a first output signal by performing filtering for forming a directivity in a first direction on received sound signals of a plurality of sound receivers for receiving sounds from the sound source;
    obtaining a second output signal by performing filtering for forming a non-zero directive signal in a second direction which is different from the first direction on received sound signals of the sound receivers;

obtaining strength comparison data from a strength of the first output signal and a strength of a second output signal; and estimating sound source direction data of the sound source on the basis of the strength comparison data.

* * * * *